United States Patent
Benaets

(10) Patent No.: US 7,485,358 B2
(45) Date of Patent: Feb. 3, 2009

(54) SUBFLOOR

(75) Inventor: Johan Benaets, Bilzen (BE)

(73) Assignee: Pregis Innovative Packaging Inc., Deerfield, IL (US)

( * ) Notice: Subject to any disclaimer, the term of this patent is extended or adjusted under 35 U.S.C. 154(b) by 0 days.

(21) Appl. No.: 10/380,664

(22) PCT Filed: Dec. 21, 2001

(86) PCT No.: PCT/BE01/00223

§ 371 (c)(1),
(2), (4) Date: Mar. 17, 2003

(87) PCT Pub. No.: WO02/052114

PCT Pub. Date: Jul. 4, 2002

(65) Prior Publication Data

US 2003/0180502 A1    Sep. 25, 2003

(30) Foreign Application Priority Data

Dec. 22, 2000  (BE) .................................... 823

(51) Int. Cl.
*B32B 3/04* (2006.01)

(52) U.S. Cl. .................... 428/124; 428/47; 428/44; 428/189; 428/194; 428/317.3; 428/77; 428/61; 428/60; 428/58; 428/59; 428/314; 52/309.4; 52/403.1; 52/592.1; 52/309.9; 52/309.8

(58) Field of Classification Search ............... 428/47, 428/44, 189, 194, 317.3, 124, 77, 61, 60, 428/58, 59, 314; 52/309.4, 403.1, 592.1, 52/309.9, 309.8
See application file for complete search history.

(56) References Cited

U.S. PATENT DOCUMENTS

| | | | |
|---|---|---|---|
| 3,121,649 A | 2/1964 | Oliver | 156/71 |
| 3,499,819 A | 3/1970 | Lewis | 161/161 |
| 3,607,603 A | 9/1971 | Coverdale, Jr. | 161/160 |
| 3,608,006 A | 9/1971 | Hosoda et al. | 264/47 |
| 3,666,611 A | 5/1972 | Joa | 161/147 |
| 3,991,252 A | 11/1976 | Kolakowski et al. | 428/313 |
| 4,073,998 A | 2/1978 | O'Connor | 428/310 |
| 4,121,958 A | 10/1978 | Koonts | 156/79 |
| 4,201,609 A | 5/1980 | Olsen | 156/85 |
| 4,243,619 A | 1/1981 | Fraser et al. | 264/40.6 |
| 4,271,218 A | 6/1981 | Heckel et al. | 428/36 |
| 4,310,587 A | 1/1982 | Beaupre | 428/246 |
| 4,421,807 A | 12/1983 | Clausing et al. | 428/41 |

(Continued)

FOREIGN PATENT DOCUMENTS

DE          6605008          5/1967

(Continued)

*Primary Examiner*—Jane Rhee
(74) *Attorney, Agent, or Firm*—Dorsey & Whitney, LLP

(57) ABSTRACT

The invention concerns a subfloor which is provided between a hard base (11) and a floor such as a laminate or parquet floor resting on the latter, whereby this subfloor is composed of laterally connecting mats (9, 10) having a core (1) made of a synthetic foam provided with an underlay (2) and a top layer (3) made of a synthetic foil, whereby this underlay (2) and top layer (3) represent a flap (4, 5) which extends over the side edge of said core (1), so that this flap (4, 5) overlaps with the mat (9, 10) connecting onto this side edge.

43 Claims, 1 Drawing Sheet

U.S. PATENT DOCUMENTS

| | | | |
|---|---|---|---|
| 4,657,811 A | 4/1987 | Boyd et al. | 428/318 |
| 4,682,459 A | 7/1987 | Stephenson | 52/390 |
| 4,910,936 A | 3/1990 | Abendroth et al. | 52/403 |
| 4,974,382 A | 12/1990 | Avellanet | 52/408 |
| 5,100,725 A | 3/1992 | Pearson | 428/314.4 |
| 5,103,614 A | 4/1992 | Kawaguchi et al. | 52/392 |
| 5,137,764 A | 8/1992 | Doyle et al. | 428/44 |
| 5,173,346 A | 12/1992 | Middleton | 428/53 |
| 5,316,835 A | 5/1994 | Groft et al. | 428/247 |
| 5,501,895 A | 3/1996 | Finley et al. | 428/194 |
| 5,617,687 A | 4/1997 | Bussey, Jr. et al. | 52/404.2 |
| 5,952,076 A | 9/1999 | Foster | 428/77 |
| 5,968,630 A | 10/1999 | Foster | 428/77 |
| 6,006,481 A * | 12/1999 | Jacobs | 52/309.9 |
| 6,189,279 B1 | 2/2001 | Fiechtl | 52/403.1 |
| 6,698,157 B1 * | 3/2004 | Porter | 52/794.1 |
| 2002/0155274 A1 | 10/2002 | Ramesh et al. | 428/317.1 |

FOREIGN PATENT DOCUMENTS

| | | |
|---|---|---|
| GB | 578697 | 7/1946 |
| WO | WO 90/14945 | 12/1990 |

* cited by examiner

SUBFLOOR

The invention concerns a mat with an underlay and top layer made of a synthetic foil in between which is provided a core of supple synthetic foam and which is designed to serve as a subfloor, in particular of a laminate or parquet floor.

When laying a laminate or parquet floor, a subfloor must be provided between the latter and the base. This subfloor provides for an acoustic and thermal insulation on the one hand, and it prevents moisture from the base from getting into contact with the laminate or parquet floor. Moreover, the use of a subfloor makes it possible to compensate for unevennesses which may be found in the base.

According to the state of the art, such a subfloor is formed by applying a damp-proof synthetic foil on the base so as to form a moisture barrier, whereby a mat of polyethylene foam is subsequently placed on this synthetic foil.

Laying such a subfloor is rather time-consuming since, in a first stage, said synthetic foil must be applied whereby, next, in a second stage, the mat of synthetic foam must be laid on this foil.

Thus, the synthetic foil or said mat are frequently damaged while being laid, since they only have a limited rigidity. Moreover, when a subfloor is provided in a relatively large space, several synthetic foils have to be laid next to one another, so that moisture from the base can penetrate in the laminate or parquet floor via the connection between the synthetic foils, as a result of which no perfectly sealed moisture barrier is obtained.

The invention aims to remedy these disadvantages by providing a mat for a subfloor which can be very easily laid and which offers a better resistance against damage and which moreover forms an almost perfect moisture barrier, irrespective of the size of the base.

To this aim, the above-mentioned underlay and top layer have a flap extending laterally in relation to said core.

Practically, the flap of the underlay and the flap of the top layer will extend on one and the same side edge of said core.

According to a preferred embodiment of the mat according to the to invention, the flap of the underlay is provided on the side edge of said core opposite to the side edge where the flap of the underlay extends.

In an advantageous manner, a strip of glue is provided which extends on the upper side of the mat at a distance from the side edge, situated opposite to the flap of the top layer, which is smaller than the width of this flap.

According to a special embodiment, the flap of said top layer is folded down on the corresponding side edge up to against the upper side of the mat.

The invention also concerns a subfloor which is provided between a hard base and a floor resting upon the latter, such as a laminate or parquet floor, which subfloor is composed of laterally connecting mats having a core made of synthetic foam provided with an underlay and a top layer made of a synthetic foil which represent a flap Which extends over the side edge of the core, whereby this flap overlaps with the mat connected onto this side edge.

According to a preferred embodiment of the subfloor according to the invention, a strip of glue is provided between said mat and the flap of the corresponding connected mat overlapping with it.

According to a further preferred embodiment of the subfloor according to the invention, the flap of the top layer and that of the underlay extend on one and the same side edge of said mats.

Other particularities and advantages of the invention will become clear from the following description of some embodiments of the mat and the subfloor according to the invention; this description is given as an example only and does not restrict the scope of the claimed protection in any way; the reference figures used hereafter refer to the accompanying drawings.

In the different drawings, the same reference figures refer to identical or analogous elements.

Figure 1:
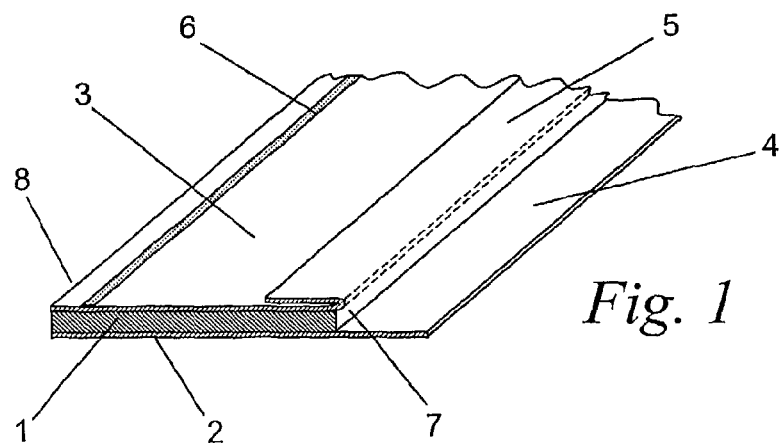
FIG. 1 is a schematic view in perspective of a first embodiment of the mat according to the invention.

The mat according to the invention, as represented in FIG. 1, consists of a strip of a certain length and is formed of a core 1 made of a relatively supple synthetic foam, preferably selected from the group of polyolefine foams, such as for example polyethylene foam with closed cells, coated with an underlay 2 and a top layer 3 of a preferably supple synthetic foil. The underlay 2 and the top layer 3 are fixed to the core 1 by means of gluing or flame lamination. Further, the underlay 2 and preferably also the top layer 3 are impermeable to moisture, and they are made for example of a polyethylene foil. The thickness of the underlay 2 and the top layer 3 amounts to, preferably, 30 μm to 250 μm and is, for example, in the order of magnitude of 100 μm to 200 μm, in particular 150 μm, whereas the core 1 has a thickness of 1.5 to 5 mm and is preferably almost 2 to 3 mm thick. The total thickness of the mat is thus preferably in the order of magnitude of 2 to 3 mm.

The underlay 2 and the top layer 3 are wider than the core 1, so that the side edges thereof form a flap 4 and 5 which extend laterally in relation to the core 1. In the embodiment of the mat according to the invention represented in FIG. 1, the flap 4 of the underlay 2 and the flap 5 of the top layer 3 extend on one and the same side edge 7 of the core 1.

Further, on the upper side of the mat is provided a strip of glue 6 which extends almost continuously along the side edge 8 thereof opposite to the side edge 7 where the above-mentioned flap 5 of the top layer 3 is provided.

This strip of glue 6 extends at a distance from the side edge 8 which is smaller than the width of this flap 5 of the top layer 3.

In order to simplify the laying of the mat when creating a subfloor, the flap 5 of the top layer 3 is folded down up against the upper side of the mat, as represented in FIG. 1.

Figure 2:
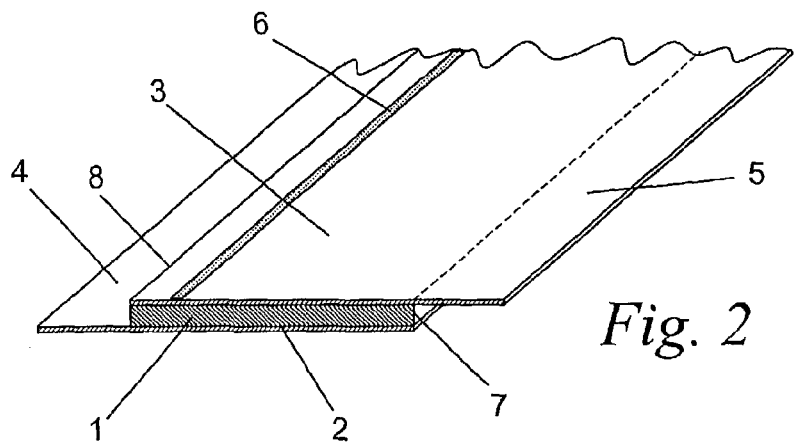
FIG. 2 is a schematic view in perspective of a second embodiment of the mat according to the invention.

FIG. 2 represents a variant of the preceding embodiment of the mat according to the invention. With this mat, the flap 4 of the underlay 2 extends on the side edge 8 of the core 1, whereas the flap 5 of the top layer 3 extends on the opposite side edge 7.

The mat according to the invention is designed to be placed on a hard base to thus form a subfloor, for example for a laminate or parquet floor, which is damp-proof and which can compensate for possible unevennesses in this base.

Figure 3:
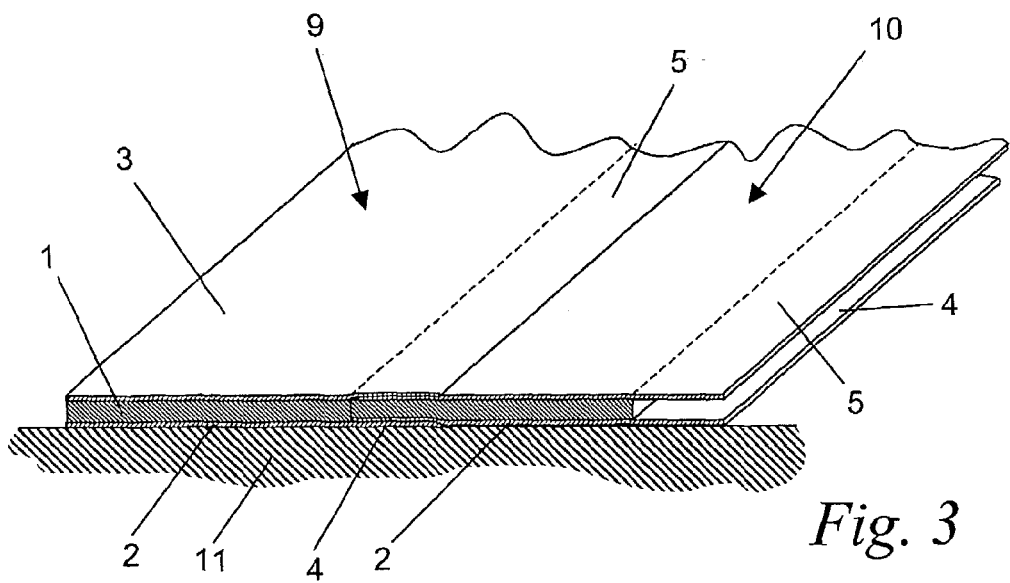
FIG. 3 is a schematic view in perspective of a part of a subfloor according to the invention.

FIG. 3 represents a subfloor formed of laterally connecting mats 9 and 10 which are placed with their underlay 2 on a base 11. The mats 9 and 10 correspond to the embodiment of the mat according to the invention, as represented in FIG. 1.

Thus, when creating a subfloor, a first mat 9 is laid on the base 11, whereby the flap 5 of the top layer 3 thereof is folded down up against the upper side of the mat 9.

Then, a second mat 10 is laid next to this first mat 9, whereby the cores 1 of these mats connect laterally and the side edge 8 of the second mat 10, which does not have any flaps, is connected to the side edge 7 with the flaps 4 and 5 of the first mat 9.

This second mat 10 hereby partially rests on the flap 4 of the underlay 2 of said first mat 9, so that the underlays 2 of the mats 9 and 10 overlap.

Finally, the flap 5 of the top layer 3 of said first mat 9 is folded down as of the position as represented in FIG. 1 to up against the top layer 3 of the second mat 10, such that this flap 5 is put into contact with the strip of glue 6 of the second mat 10.

By making such mats successively connect laterally in this manner, a subfloor is created forming an almost perfect moisture and damp barrier, thus preventing moisture from the base 11 of getting into contact with the laminate or parquet floor which is to be laid on top of the subfloor.

The top layer 3 of the mat according to the invention is preferably made of a synthetic foil with a small coefficient of friction. This makes it possible, when laying the laminate or parquet floor, to slide the constituent panels of this floor over the top layer, which considerably simplifies the laying thereof.

It was found that the mats according to the invention are more rigid and are less easily damaged when laying a subfloor, compared to a plastic foil or a synthetic foam core when the latter are placed successively and as separate on a base.

As the thus obtained subfloor forms a moisture barrier, the risk that the laminate or parquet floor will warp or become damaged due to the moisture from the base is practically negligible.

Naturally, the invention is not limited to the above-described mat and subfloor represented in the accompanying drawings. Thus, said strip of glue 6 can for example be provided on the underlay 2 of the mat 9, such that the latter is joined in a moisture-proof manner to the flap of the underlay 2 of a connecting mat 10.

In certain cases, a strip of glue is provided on the top layer of the mat as well as on the underlay thereof.

The strip of glue can for example also be provided on the side of the flap turned towards the core. Further, a protecting strip is usually provided on the strip of glue 6 which must be removed when laying the subfloor before joining the connecting mats together via the respective flap of the top layer.

The mat according to the invention is advantageously rolled up, in order to simplify its transport, in a direction across said side edges, whereby the top layer is situated on the inner side of the thus formed roll. When laying the subfloor, these rolls are then unrolled next to one another and they are joined together by unfolding the flap of the top layer against the corresponding strip of glue.

Although the above description concerns a subfloor of a laminate or parquet floor, the mat according to the invention is also suitable to be used as a subfloor for all sorts of floors whereby a moisture barrier and an insulation is to be provided between the base and the floor, such as for example for cork floors. The mat according to the invention can generally be applied for practically all types of sprung floors.

The invention claimed is:

1. A moisture barrier subfloor comprising a mat, the mat comprising:
    an underlay and a top layer each made of a synthetic foil in between which is provided a core of synthetic foam, the underlay and the top layer each having a flap which extends laterally in relation to said core,
    at least one area of glue disposed on an exterior surface opposite the core of at least one of the top layer and the underlay, wherein the at least one area of glue is not on the flap but is disposed at a location on the exterior surface to receive and secure thereto a flap of an adjacent mat of similar configuration, and
    a removable protective area covering the at least one area of glue.

2. The mat according to claim 1, wherein the flap of the underlay and the flap of the top layer extend on a same side edge of said core.

3. The mat according to claim 1, wherein the at least one area of glue extends on the top layer at a distance from a side edge situated opposite to the flap, the distance being smaller than the width of the flap.

4. The mat according to claim 1, wherein said core is made of polyolefin foams.

5. The mat according to claim 1, wherein said synthetic foil has a thickness of 150 μm to 250 μm.

6. A moisture barrier subfloor to be provided between a hard base and a floor resting on the latter, the subfloor comprising a plurality of mats of claim 1,
    wherein the removable protective area is removed so that adjacent mats can be laterally connected with the at least one area of glue of one mat receiving and securing the flap of an adjacent mat and with the core of one mat contacting only the core or the synthetic foil of an adjacent mat.

7. The subfloor according to claim 6, wherein the at least one area of glue is provided on the exterior surface of the at least one mat with the flap of the adjacent connecting mat in an overlapping relation with the at least one area of glue.

8. The subfloor according to claim 6, wherein the flap of the top layer and the flap of the underlay extend on the same side edge of said mats.

9. The subfloor according to claim 6, wherein the core of said mats is made of polyolefin foams.

10. The subfloor according to claim 6, wherein said synthetic foil has a thickness of 150 μm to 250 μm.

11. The mat according to claim 5, wherein said synthetic foil has a thickness of 200 μm.

12. The subfloor according to claim 10, wherein said synthetic foil has a thickness of 200 μm.

13. A mat for use under a floor comprising;
    a synthetic foam core laminated to a top layer and a bottom layer, said top and bottom layers each made of synthetic film, said bottom layer having a flap extending beyond an edge of said core,
    at least one area of glue disposed on an exterior surface opposite the core of at least one of the top layer and the bottom layer, wherein the at least one area of glue is not on the flap but is disposed at a location on the exterior surface to receive and secure thereto a flap of an adjacent mat of similar configuration, and
    a removable protective area covering the at least one area of glue.

14. The mat of claim 13 wherein said flap is configured to extend over an adjacent mat of similar configuration.

15. The mat of claim 13 wherein both said top and bottom layers have a flap extending beyond an edge of said core.

16. The mat of claim 15 wherein said top layer and said bottom layer have flaps extending beyond the same edge of said core.

17. The mat of claim 13 wherein said synthetic foam is a polyolefin foam.

18. The mat of claim 17 wherein said polyolefin is polyethylene.

19. The mat of claim 13 wherein said synthetic film is polyethylene.

20. The mat of claim 13 wherein said core has a thickness of about 1.5 to 5 mm.

21. The mat of claim 13 wherein said film has a thickness of about 30 to 250 μm.

22. The mat of claim 21 wherein said film has a thickness of about 150 to 250 μm.

23. A flooring system comprising a floor and a moisture barrier subfloor, wherein said subfloor includes a plurality of mats of claim 13, wherein the removable protective area is removed so that adjacent mats can be laterally connected with the at least one area of glue of one mat receiving and securing the flap of an adjacent mat and with the core of each mat contacting only the core or the synthetic foil of an adjacent mat.

24. The flooring system of claim 23 wherein said flap is configured to extend over an adjacent mat.

25. The flooring system of claim 23 wherein both said top and bottom layers have a flap extending beyond an edge of said core.

26. The flooring system of claim 25 wherein said top layer and said bottom layer have flaps extending beyond the same edge of said core.

27. The flooring system of claim 23 wherein said area of glue is covered by a removable protective area.

28. The flooring system of claim 23 wherein said synthetic foam is a polyolefin foam.

29. The flooring system of claim 28 wherein said polyolefin is polyethylene.

30. The flooring system of claim 23 wherein said synthetic film is polyethylene.

31. The flooring system of claim 23 wherein said core has a thickness of about 1.5 to 5 mm.

32. The flooring system of claim 23 wherein said film has a thickness of about 30 to 250 μm.

33. The flooring system of claim 32 wherein said film has a thickness of about 150 to 250 μm.

34. The mat of claim 1, wherein the at least one area of glue is at least one strip of glue.

35. The subfloor of claim 6, wherein the at least one area of glue is at least one strip of glue.

36. The mat of claim 13, wherein the at least one area of glue is at least one strip of glue.

37. The flooring system of claim 23, wherein the at least one area of glue is at least one strip of glue.

38. The mat of claim 1, wherein the flap proximate the at least one area of glue has a surface facing toward the core that is substantially free of glue.

39. The mat of claim 38, wherein the flap proximate the at least one area of glue has another surface facing away from the core that is also substantially free of glue.

40. The mat of claim 1, wherein the at least one area of glue extends along a strip that is substantially parallel to a lateral edge of the flap.

41. The mat of claim 40, wherein the at least one area of glue is disposed adjacent an edge of the mat opposite the flap, such that the at least one area of glue is substantially completely covered by a flap of an adjacent mat of similar configuration that is received and secured thereto.

42. The mat of claim 13, wherein the flap has a surface facing toward the core and another surface facing away from the core, at least one of the surfaces of the flap being substantially free of glue.

43. The mat of claim 13, wherein the at least one area of glue extends along a strip that is substantially parallel to a lateral edge of the flap and is disposed adjacent an edge of the mat opposite the flap, such that the at least one area of glue is substantially completely covered by a flap of an adjacent mat of similar configuration that is received and secured thereto.

* * * * *